United States Patent [19]

Zhu et al.

[11] Patent Number: 5,534,937
[45] Date of Patent: Jul. 9, 1996

[54] MINIMUM-DELAY JITTER SMOOTHING DEVICE AND METHOD FOR PACKET VIDEO COMMUNICATIONS

[75] Inventors: Qin-Fan Zhu, Stoughton; Mei Yong, Canton, both of Mass.

[73] Assignee: Motorola, Inc., Schaumburg, Ill.

[21] Appl. No.: 227,438

[22] Filed: Apr. 14, 1994

[51] Int. Cl.$^6$ .................................................. H04N 7/00
[52] U.S. Cl. ........................ 348/466; 370/102; 348/467
[58] Field of Search ................................. 348/461, 463, 348/465, 466, 467, 497; 370/102; H04N 7/00

[56] References Cited

U.S. PATENT DOCUMENTS

| | | | |
|---|---|---|---|
| 4,731,646 | 3/1988 | Kliem | 370/102 |
| 5,067,126 | 11/1991 | Moore | 370/102 |
| 5,111,485 | 5/1992 | Serack | 370/102 |
| 5,121,205 | 6/1992 | Ng et al. | 348/467 X |
| 5,131,013 | 7/1992 | Choi | 370/102 |
| 5,148,271 | 9/1992 | Kato et al. | 348/384 |
| 5,159,447 | 10/1992 | Haskell et al. | 348/469 |
| 5,241,543 | 8/1993 | Amada et al. | 370/102 |
| 5,287,360 | 2/1994 | Regent | 370/102 X |
| 5,341,492 | 8/1994 | Sakata | 370/102 |
| 5,353,313 | 10/1994 | Honea | 370/102 |

*Primary Examiner*—Victor R. Kostak
*Attorney, Agent, or Firm*—Darleen J. Stockley

[57] ABSTRACT

The method and device of the present invention provide a mechanism at a network node to compensate for variable delays or delay jitters of video packets transported over a packet-switched network, such as an ATM network, and generate a continuous bitstream to an external decoder. The received video packets with variable delays are first depacketized and stored in a video information buffer and then are sent to the external decoder through another constant or variable bit-rate channel. Based on a hypothetical decoder buffer verifier condition, stuffing bits are inserted into the output video bitstream to prevent the decoder buffer from overflowing. Stuffing bits are sent if one of the following two cases occurs: A) the condition of the hypothetical decoder buffer verifier is violated; B) the video information buffer is empty. A minimum number of stuffing bits are sent each time to minimize the incurred delay and concurrently make the following three conditions satisfied: 1) overflow of the decoder buffer is avoided; 2) idleness of the channel is avoided; 3) the stuffing bits must comply with the syntax of the video bitstream.

35 Claims, 5 Drawing Sheets

MINIMUM-DELAY JITTER SMOOTHING DEVICE AND METHOD FOR PACKET VIDEO COMMUNICATIONS

FIELD OF THE INVENTION

This invention relates generally to packet video communications, and more particularly to delay jitter smoothing in packet video communications.

BACKGROUND

An important problem in packet video transmission is the variable delay, or delay jitter. Delay jitter can be caused by variable packetization delay and variable queuing delay in the network. Variable packetization delay results from variable bit-rate (VBR) coding and is usually small compared to the variable queuing delay. On the other hand, variable queuing delay depends on the level of network congestion and can vary in a wide range. Such delay jitter needs to be compensated in order to ensure a constant playout of a video bitstream and/or to ensure that the decoder buffer at the receiving video terminal will not overflow.

A state-of-the-art solution for the delay jitter problem is to utilize the so-called time stamp, which is generated at the encoder and is modified by each network node along its route from source to destination. Provided that the maximum end-to-end delay from the source node to the destination node is known and the time stamp can be recovered for each packet, an extra delay, commonly referred to as smoothing delay, is added to each packet such that the overall delay (queuing delay plus smoothing delay) equals a constant for all packets.

Figure 1:
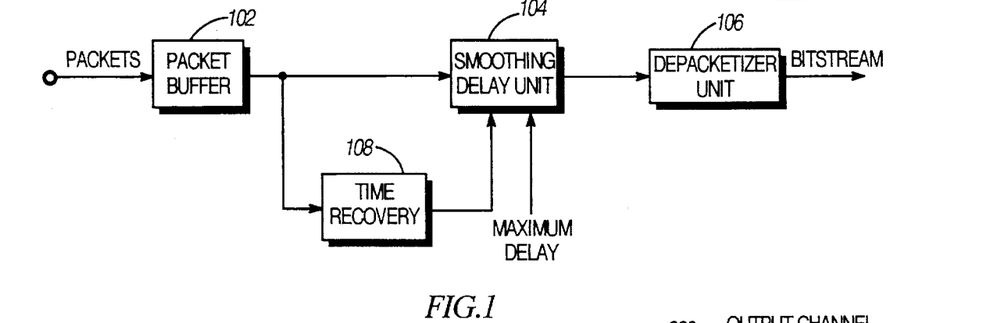
FIG. 1 is a block diagram schematic of a jitter smoothing system as is known in the art.

FIG. 1, numeral 100, is a general block diagram schematic of a delay jitter smoothing system as is known in the art. The input of the system is video packets with variable delays. These packets are first stored in a packet buffer (102). The time stamp of each packet is recovered by a time recovery device (108) and a smoothing delay unit (104) adds a smoothing delay to the packet. The time recovery device (108) is coupled to the packet buffer (102) and provides its output to the smoothing delay unit (104) which is also coupled to the packet buffer (102). The smoothing delay is equal to the difference between a predetermined maximum delay and the actual delay suffered by each packet. Then the smoothed packets are depacketized into bitstream by a depacketizer unit (106) in a predetermined manner.

In the above system, a complex procedure is involved to implement the time recovery system, because it requires intermediate network nodes to update the time stamp based on the delay encountered in network queues. In addition, the maximum delay of the network has to be known beforehand in order to add the correct amount of smoothing delay in the receiving node. On the other hand, the worst delay for different services at different times may vary depending on the network congestion. If the network traffic load is relatively low during the entire service period, then the queuing delay for all packets may be much smaller than the maximum delay. However, the jitter smoother will still add an extra delay to keep the overall delay constant. Conceivably in this case, a shorter overall delay can be obtained by using an improved smoothing algorithms.

Thus, there is a need for a device and method that provide smoothing delay while concurrently minimizing implementation complexity.

DETAILED DESCRIPTION OF A PREFERRED EMBODIMENT

The jitter smoothing method and device of the present invention, the device being referred to herein as a "minimum-delay jitter smoother", add a minimum delay to the received bitstream and at the same time guarantee that the decoder buffer will not overflow. Instead of performing jitter smoothing at the individual cell level, the present invention implements jitter smoothing at the video frame level. A very important feature of video communications is that a video frame can be displayed only after all the information for the frame is received, implying that some delay jitter may be allowed for the packets which contain information that belong to the same video frame. The present invention eliminates the need to recover the time stamp for each packet and hence reduces the system complexity. Furthermore, the present invention does not require prior knowledge of the worst network delay D. Thus, the present invention provides for a minimized jitter smoothing delay with concurrent minimized implementation complexity.

Figure 2:
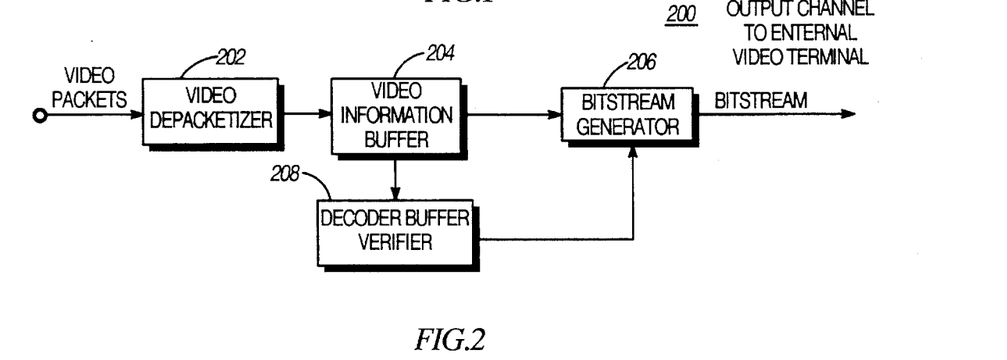
FIG. 2 is a block diagram schematic of one embodiment of a device in accordance with the present invention.

FIG. 2, numeral 200, is a block diagram schematic of one embodiment of a device, a minimum-delay jitter smoother, in accordance with the present invention. In the present invention, the video depacketizer (202) is used to depacketize the received video packets. The depacketized bitstream is stored in a video information buffer (204). Due to the variable delays suffered by different packets, the external decoder buffer may overflow or underflow if no countermeasure is applied during this process. In order to avoid such overflow, a decoder buffer verifier (DBV) (208) is attached to the video information buffer (204) to monitor the fullness of the DBV buffer. Thus, the decoder buffer verifier (DBV) (208) provides substantially the same function as the decoder buffer verifier used at the external encoder. At each frame interval, DBV buffer fullness is examined and a predetermined condition is checked. Where the predetermined condition is violated, a number of stuffing bits determined by a predetermined scheme are outputted to the bitstream generator (206) before sending video bits from the video information buffer (204). The predetermined condition for the DBV determines the smallest number of stuffing bits to minimize the incurred delay at the decoder. The stuffing is performed without introducing decoding ambiguity at the external decoder.

When the present invention generates the minimum smoothing delay, decoder buffer underflow may occur because of delay jitter. However, decoder buffer underflow usually does not cause a severe problem since the decoder can always repeat displaying the same video frame while waiting for data of the next frame. Furthermore, decoder buffer underflow typically happens only a few times during a period of continuous transmission of video service. Assuming that a worst network delay is D and the frame period is T, then the maximum number of occurrences of decoder buffer underflow U is the smallest integer which is no less than D/T. For example, where D=120 ms (milliseconds) and T=67 ms, then U=2.

The present invention smoothes delay jitter of video packets transmitted over packet-switched networks. Thus, the device in accordance with the present invention includes a video depacketizer (202), a video information buffer (204) that is operably coupled to the video depacketizer (202), a decoder buffer verifier (DBV) (206) that is operably coupled to the video information buffer (204), and a bitstream generator (208) that is operably coupled to the video information buffer (204) and to the DBV (206). The video depacketizer (202)is used to receive and depacketize video packets. The video information buffer (204) is used to store the output bits from the video depacketizer (202). The DBV (208) updates a hypothetical decoder buffer (HDB) fullness and verifies the HDB condition based on a pre-determined criterion. The bitstream generator (206) reads bits from the video information buffer (204) at a predetermined rate and inserts stuffing bits into the output bitstream whenever the HDB condition, described further below, is violated or whenever the video information buffer (204) is empty.

Figure 3:
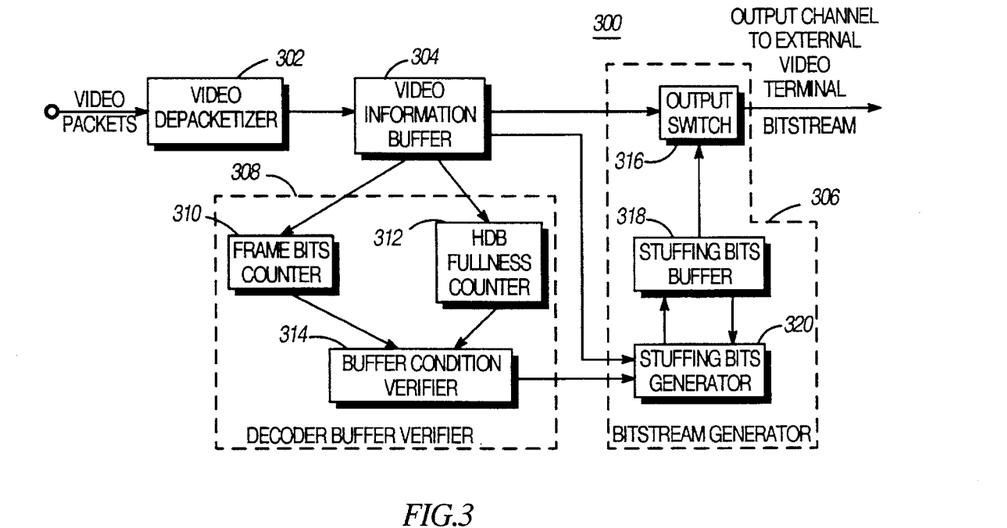
FIG. 3 is a block diagram schematic of an embodiment of FIG. 2 with greater particularity.

One embodiment of the minimum-delay jitter smoother device of FIG. 2 is shown with greater particularity in FIG. 3, numeral 300. The device includes: (A) a video depacketizer (302) that is operably coupled to receive and depacketize video packets, (B) a video information buffer (304) that is operably coupled to receive output bits from a video depacketizer (302), (C) a decoder buffer verifier (DBV) (308) that is operably coupled to the video information buffer (304) and that includes a frame bit counter (310), a hypothetical decoder buffer fullness counter (312) and a buffer condition verifier (314), and (D) a bitstream generator (306) that is operably coupled to the video information buffer (304) and to the DBV (308) and that includes a stuffing bits generator (320), a stuffing bits buffer (318), and an output switch (316). The HDB fullness counter (312) is an imaginary buffer in the DBV that monitors the output bits from the video information buffer (304) to prevent overflow at the external decoder buffer. The frame bit counter (310) and the HDB fullness counter (312), which are each operably coupled to the video information buffer (304), are used to count a number of bits for each frame En and a decoder buffer fullness Bn, respectively. The buffer condition verifier (314), which is operably coupled to the frame bit counter (310) and to the HDB fullness counter (312), is activated at every frame interval. If the frame bit counter (310) shows there is at least one frame number of bits in the HDB fullness counter, then the number of bits corresponding to the oldest frame in the HDB fullness counter is removed or subtracted from the HDB fullness counter. Then a predetermined HDB condition is checked in the buffer condition verifier. Where the predetermined HDB condition is violated, the buffer condition verifier (314) provides to the stuffing bits generator (320) a number equal to the number of stuffing bits $S_n$. The stuffing bits generator (320) is operably coupled to the video information buffer (304), to the buffer condition verifier (314), and to the stuffing bits buffer (318) and is used to monitor the fullness of both the video information buffer (304) and stuffing bits buffer (318). The stuffing bits generator (320) will be activated to generate the stuffing bits under two situations.

In the first situation, after a frame is removed from the HDB fullness counter, a nonzero $S_n$ is inputted from the buffer condition verifier (314). In this case, the stuffing bits generator (320) is used to generate $S_n$ stuffing bits. Since the stuffing bits must necessarily be generated in compliance with a preselected decoder bitstream syntax, the number of the generated stuffing bits $\hat{S}_n$ may be different from $S_n$. Thus, $\hat{S}_n$ is chosen such that it is the smallest possible number that is no less than $S_n$ in order to reduce the incurred delay at the decoder.

In the second situation, when both the video information buffer (304) and the stuffing bits buffer (318) are empty, the stuffing bits generator (320) will generate the minimum number of stuffing bits which is in compliance with the preselected decoder bitstream syntax to ensure that channel will not be idle.

The stuffing bits buffer (318) is operably coupled to the stuffing bits generator (320) and stores the generated bits from the stuffing bits generator (320). The output switch is operably coupled to the video information buffer (304) and the stuffing bits buffer (318) and is used to get bits into an output channel. Where the stuffing bits buffer contains at least one bit, the output switch (316) receives input from the stuffing bits buffer (318). Otherwise, the output switch (316) receives input from the video information buffer (304).

The buffer condition verifier (314), together with the frame bit counter (310) and the HDB fullness counter (312), performs substantially the same function as what is called the decoder buffer verifier (DBV) used at the external encoder.

Figure 4:
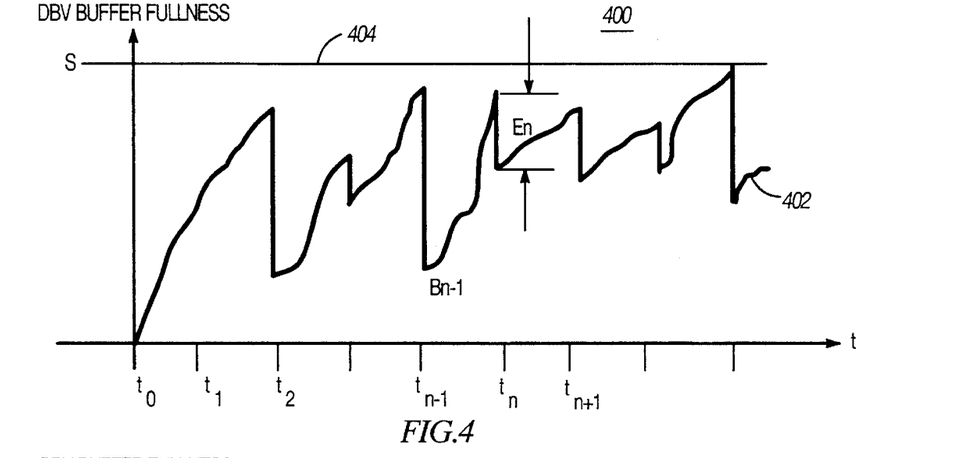
FIG. 4 is a diagram that illustrates the dynamics of a decoder buffer verifier (DBV) buffer fullness condition where VBR coding is used in the encoder.

FIG. 4, numeral 400, is a diagram that illustrates the dynamics of the DBV buffer fullness condition in the case where VBR coding is used in the encoder. The t-axis is labeled as the video frame display interval. In the CIF (Common Intermediate Format), the frame interval is approximately 33 ms. Where the buffer fullness (402) is $B_{n-1}$ at time tn-1, just after frame n-1 is removed from the hypothetical decoder, the number of coded bits for frame n is $E_n$, and the output channel rate is R(t) bits per second. Then in order for the decoder buffer not to overflow, the following inequality has to be satisfied:

$$B_{n-1} + \int_{t_{n-1}}^{t_{n+1}} R(t)dt - E_n < S$$

where S (404) is the buffer size and $$R_{n-1,n+1} = \int_{t_{n-1}}^{t_{n+1}} R(t)dt$$

is the number of output bits from time tn-1 to tn+1 sent to the channel. Thus, in order to prevent the decoder buffer from overflow, one of $E_n$ and R(t) may be adjusted. If $E_n$ is kept the same as what is generated by the encoder, then no more than $R_{n-1,n+1}$ bits are permitted to be transmitted to the channel during the time interval from tn-1 to tn+1, i.e.

$$R_{n-1,n+1} < S - B_{n-1} + E_n.$$

On the other hand, where the bit-rate of the channel is not adjustable, then the following inequality must be maintained:

$$E_n > B_{n-1} + R_{n-1,n+1} - S.$$

Where the above relation is violated, the number of stuffing bits $S_n$ is added, wherein $$S_n = B_{n-1} + R_{n-1,n+1} - S - E_n$$

is utilized to maintain the buffer condition.

In the case of a fixed constant bit rate (CBR) channel, such as MPEG1, $R_{n-1,n+1}$ is simplified to $$R_{n-1,n+1} = R*(t_{n+1} - t_{n-1}) = 2T*R$$

where R is the channel rate and T is the frame interval. Thus, when the predetermined buffer condition is violated, bits stuffing must be utilized to avoid decoder buffer overflow.

Figure 5:
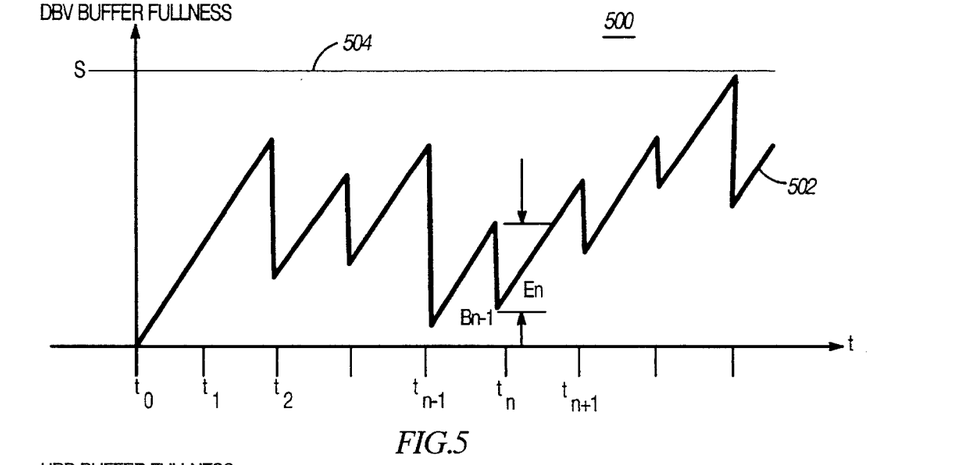
FIG. 5 is a diagram that shows the dynamics of the DBV buffer fullness condition for the case of a constant bit-rate (CBR) channel.

FIG. 5, numeral 500, is a diagram that illustrates the dynamics of buffer fullness for the case of a CBR channel. Buffer fullness (502) is shown with respect to S (504), the buffer size, over preselected time intervals.

The device and method of the present invention may be utilized to provide delay jitter smoothing in transmission of H.261 bitstreams over ATM Networks. The ITU-T Recommendation H.261 is developed for videoconferencing applications at CBR rates of p×64 where p may be any integer from 1 to 30. The input video signal format may be either CIF or QCIF (Quarter CIF), with frame rates 30/n frames per second, where n can be 1, 2, 3, 4.

Figure 6:
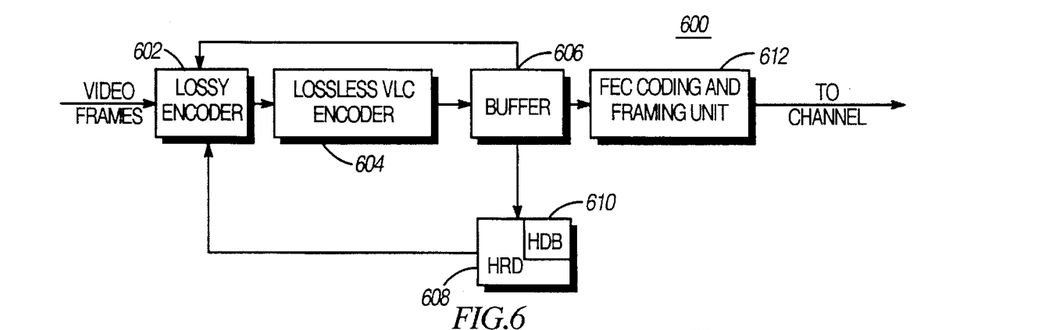
FIG. 6 is a block diagram schematic of an H.261 video encoder.

FIG. 6, numeral 600, is a block diagram schematic of an H.261 encoder. A lossy encoder (602), operably coupled to receive video frames, is used to reduce redundancies in an input video signal. Motion-compensated prediction is used to reduce temporal redundancy, and the Discrete Cosine Transform (DCT) is exploited to reduce spatial redundancy. Furthermore, a lossless variable length coder (Lossless VLC Encoder) (604), operably coupled to the lossy encoder (602), is used to reduce statistical redundancy in the output information from the lossy encoder (602). Because the bit-rate of an output channel is constant and the bit-rate of encoded video is variable, a buffer (606), operably coupled to the lossless VLC encoder (604), is used to store the coded bitstream to smooth out the bit-rate variations. A forward error control (FEC) coding and framing unit (612), operably coupled to the buffer (606), is optionally used to prevent channel errors. A decoder buffer verifier, which is called the hypothetical reference decoder (HRD) (608) in H.261, operably coupled to the buffer (606), is utilized to keep on track of a fullness of a hypothetical decoder buffer in the HRD (610) based on an amount of video information read from the video information buffer and provide an HRD output to the lossy encoder (602). A lossy encoder will adjust its output bit-rate according the feedback from the HRD to prevent the decoder buffer (606) from overflow.

Figure 7:
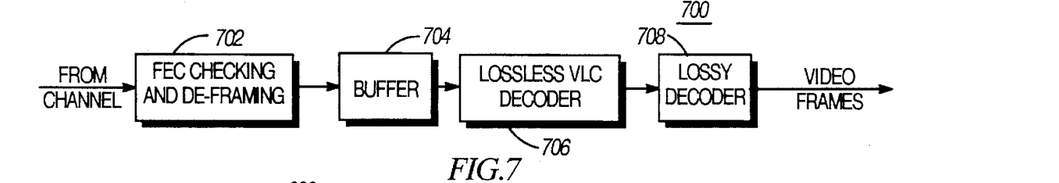
FIG. 7 is a block diagram schematic of an H.261 video decoder.

FIG. 7, numeral 700, is a block diagram schematic of an H.261 decoder, which performs the inverse operations of the H.261 encoder and reconstructs a replica of the original signal. The H.261 decoder comprises an optional FEC Checking and De-Framing Unit (702), a buffer (704), a Lossless VLC Decoder (706), and a Lossy Decoder (708) that process input from a channel to provide video frames of the replica.

Figure 8:
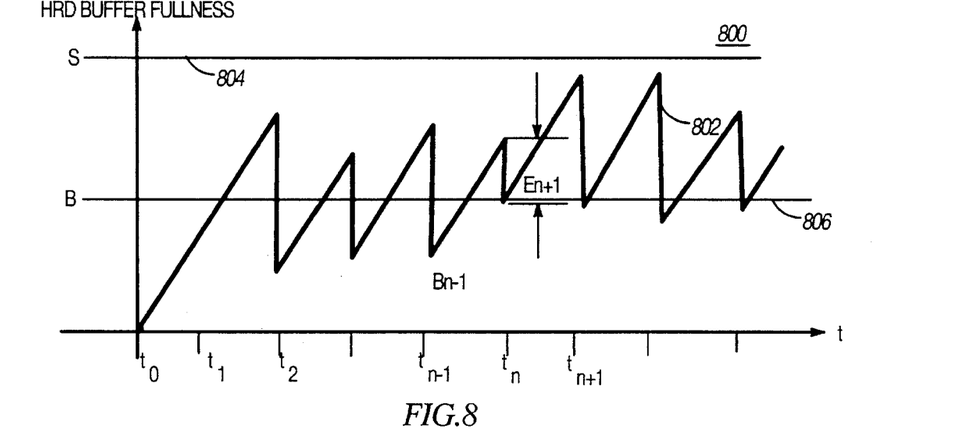
FIG. 8 is a diagram that shows DBV buffer fullness as a function of time for a decoder buffer verifier using H.261 video coding.

FIG. 8, numeral 800, illustrates the dynamics of the HRD buffer fullness as a function of time for a decoder buffer verifier using H.261 video coding. The buffer condition defined in H.261 Recommendation is:

$$E_n > B_{n-1} + R*T - B$$

where the terminology is as described above. Buffer fullness (802) is shown with respect to S (804), the buffer size, and with respect to B=4*R/29.97 (806) over preselected time intervals.

Figure 9:
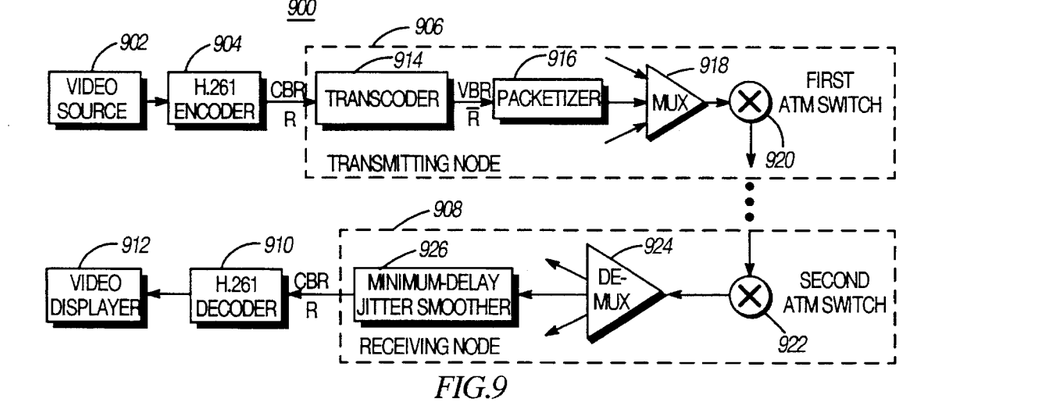
FIG. 9 is a block diagram schematic of one embodiment of a device in accordance with the present invention incorporated into a VBR H.261 video communication system over an asynchronous transfer mode (ATM) network.

FIG. 9, numeral 900, is a block diagram schematic of one embodiment of a device in accordance with the present invention incorporated into a VBR H.261 video communication system over an ATM network. A video source (902) sends video data to an H.261 encoder (904) that encodes data according to a predetermined scheme to provide a coded bitstream and sends the encoded bitstream to a transmitting node (906). The transmitting node (906) receives at least a first coded bitstream from H.261 encoder(s), manipulates the bitstream(s) to form cells for transmission, and transmits the cells to a receiving node (908). The receiving node (908) converts the received cells to a bitstream for decoding and transmits the bitstream to an H.261 decoder (910). The H.261 decoder (910) decodes the bitstream and sends it to a video displayer (912) to provide a video display.

The transmitting node (906) typically includes a transcoder (914) that is operably coupled to receive constant bit rate (CBR) encoded information from the H.261 encoder (904), a packetizer (916) that is operably coupled to the transcoder (914) to receive a variable bit rate bitstream from the transcoder (914), a multiplexer (MUX) (918) that is operably coupled to the packetizer (916), and a first ATM node (920) that is operably coupled to the multiplexer (918) for transmitting cells containing the VBR encoded information. The receiving node (908) typically includes a second ATM switch (922) that is operably coupled to receive the cells, a demultiplexer (DEMUX) (924) that is operably coupled to the second ATM switch (922), and a minimum-delay jitter smoother (928) that is operably coupled to the DEMUX (924).

At the transmitting node (906), the transcoder (914) is used to convert the H.261 encoder (904) generated CBR bitstream into a VBR H.261 bitstream to minimize bandwidth through statistical multiplexing. The average of the transcoder output $\bar{R}$ is selected to be smaller than the output rate of the H.261 coder R where the rate ratio $R/\bar{R}$ is the maximum achievable statistical gain. The output from the transcoder is packetized by the packetizer (916) into ATM cells with fixed length. Then these cells are multiplexed with cells from other sources and are sent by the first ATM switch (920) to the receiving node (908). Then these cells are demultiplexed at the DEMUX (924). The output cells from the DEMUX is inputted into the minimum-delay jitter smoother (928) which performs depacketization and delay-jitter smoothing (928) as described above. The resulting bitstream is transmitted to the H.261 decoder (910) which decodes the bitstream and transmits the decoded bitstream to the video displayer (912). At each frame interval, the HDB buffer condition in the jitter smoother (928) is checked. Where the condition is violated, then the following number of stuffing bits is transmitted:

$$S_n = B_{n-1} + R*T - B - E_n.$$

There are two ways to accomplish bit stuffing in H.261. The first is to use MBA (Macroblock Address) stuffing. This is implemented by a special codeword in a VLC table for Macroblock Addresses, i.e., 0000 0001 111. MBA stuffing can be used immediately after a GOB (group of blocks) or a coded macroblock.

Figure 10:
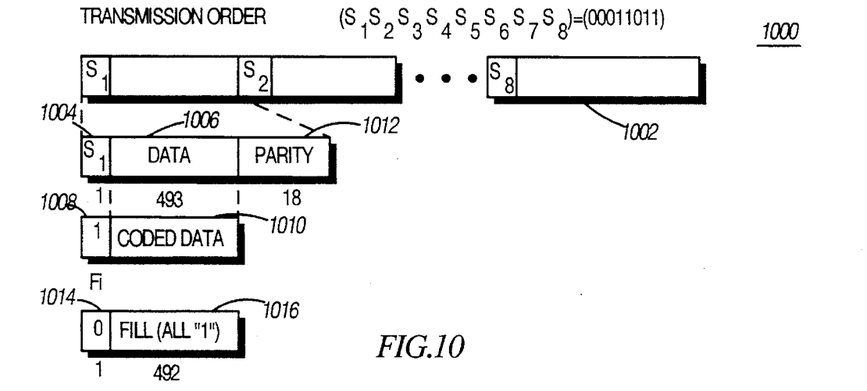
FIG. 10 graphically illustrates a frame format for use in an H.261 error correcting frame.

The second technique of stuffing may be realized through error correction framing. Before transmitting to an output channel, the coded video bitstream is placed into error correction frames shown as in FIG. 10, numeral 1000. An error correction frame is comprised of: (A) one framing bit (1004), (B) data (1006) including one bit fill indicator (Fi) bit (1008) and 492 bits of coded data (1010) and (C) 18 parity bits (1012). The frame alignment pattern (1002) is:

$(S_1 S_2 S_3 S_4 S_5 S_6 S_7 S_8) = (00011011)$, where $S_1$, $S_2$, $S_3$, $S_4$, $S_5$, $S_6$, $S_7$, and $S_8$ represent frame transmission order. The 18 parity checking bits are calculated against the first 493 bits including the Fi. Error correction framing stuffing is realized by setting Fi to zero (1014). In this case, only 492 consecutive fill bits (all 1's) (1016) are sent.

The MBA stuffing is more flexible since the number of stuffing bits can be as small as 11 bits or any multiple of 11. Utilization of the error correction framing stuffing requires insertion of a predetermined number of at least 492 stuffing bits. On the other hand, error correction framing stuffing is much easier to implement since, for MBA stuffing, the boundary of GOBs or MBs must be detected.

Figure 11:
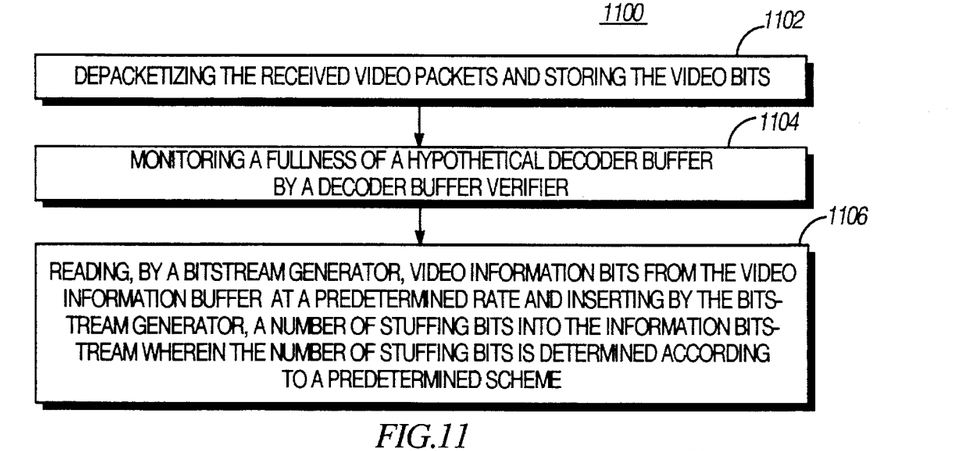
FIG. 11 is a flowchart of one embodiment of the steps of a method in accordance with the present invention.

FIG. 11, numeral 1100, is a flowchart of one embodiment of the steps of a method in accordance with the present invention. The method is implemented in a network receiving node of a packet video communication system and converts a received digital video packet stream into a continuous bitstream for transmission to a video decoder with a substantially minimized smoothing delay. The method includes the steps of: (A) depacketizing the received video packets and storing the video bits (1102); (B) monitoring a fullness of a hypothetical decoder buffer (1104) by a decoder buffer verifier (DBV); and (C) reading, by a bitstream generator, video information bits from the video information buffer at a predetermined rate and inserting, by the bitstream generator, a number of stuffing bits into the video information bitstream wherein the number of stuffing bits is determined according to a predetermined scheme (1106).

The predetermined scheme includes stuffing the stuffing bits into the bitstream when one of: (A) a predetermined hypothetical buffer condition is violated; and (B) the video information buffer is empty. In one embodiment, the sum of the stuffing bits and the bits for an immediately previous frame removed from the hypothetical decoder equals a predetermined number according to the predetermined hypothetical buffer condition.

As in the device, in the method, the predetermined hypothetical buffer condition may be selected to be of a form:

$$E_n > B_{n-1} + R_{n-1,n+1} - S.$$

where $E_n$ is the number of coded bits for frame n, $B_{n-1}$ is the buffer fullness at time $t_{n-1}$, $R_{n-1,n+1}$ is the number of bits from time $t_{n-1}$ to $t_{n+1}$ sent to the channel and S is the decoder buffer size. Violation of said buffer condition occurs when $E_n \leq B_{n-1} + R_{n-1,n+1} - S$.

After each frame is removed from the hypothetical decoder buffer, the HDB fullness is examined, the predetermined hypothetical buffer condition is checked, and where the predetermined hypothetical buffer condition is violated, the stuffing bits are outputted to the bitstream generator before sending video bits from the video information buffer.

Generally, the minimum number of stuffing bits $S_n$ is determined by $S_n = B_{n-1} + R_{n-1,n+1} - S - E_n$. For H.261 bitstream, either the macroblock address stuffing or the error correction framing stuffing can be used.

Again, the predetermined rate for reading video information bits from the video information buffer is variable.

Figure 12:
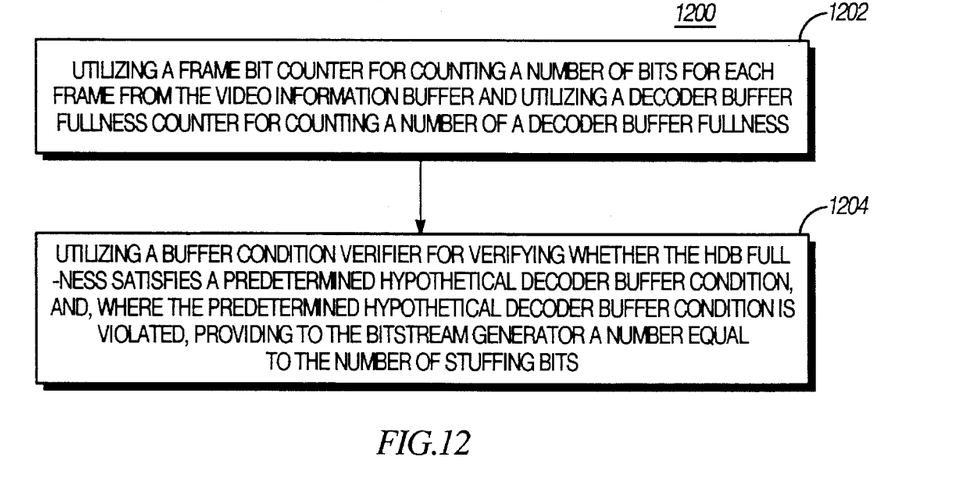
FIG. 12 is a flowchart showing the step for monitoring a fullness of a hypothetical decoder buffer (HDB) by a decoder buffer verifier (DBV) with greater particularity.

As illustrated in the flow chart of FIG. 12, numeral 1200, the step of monitoring a fullness of a hypothetical decoder buffer by a decoder buffer verifier (DBV) typically includes: (A) utilizing a frame bit counter for counting a number of bits for each frame $E_n$ from the video information buffer and utilizing a HDB fullness counter to count a HDB fullness $B_n$ (1202); (B) utilizing a buffer condition verifier for verifying whether the HDB fullness satisfies a predetermined hypothetical decoder buffer condition at each frame interval after a frame of bits is removed from the hypothetical decoder buffer and, where the predetermined hypothetical decoder buffer condition is violated, providing to the bitstream generator a number equal to the number of stuffing bits $S_n$ (1204).

Figure 13:
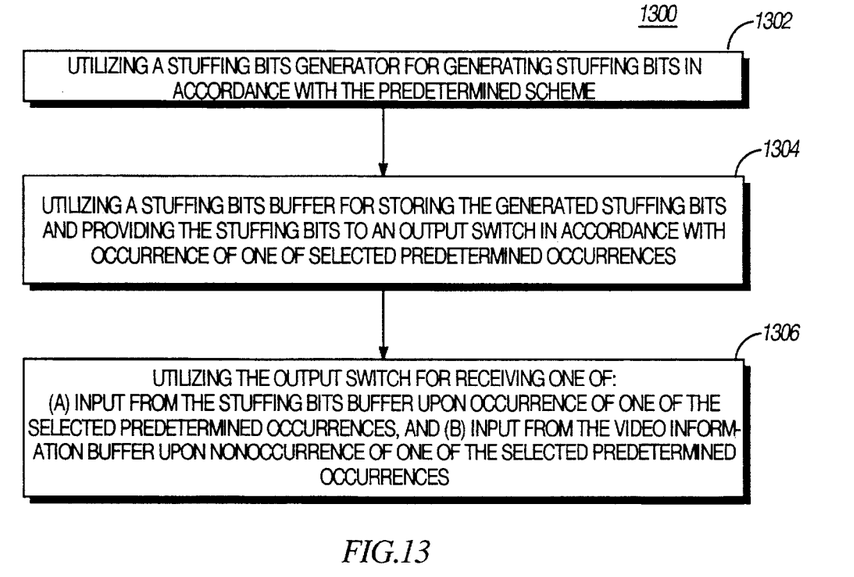
FIG. 13 is a flowchart showing, with greater particularity, the step of reading, by a bitstream generator, video information bits from the video information buffer at a predetermined rate and inserting, by the bitstream generator, a number of stuffing bits into the video information bitstream wherein the number of stuffing bits is determined according to a predetermined scheme to provide substantially minimized delay jitter smoothing.

As illustrated in the flow chart of FIG. 13, numeral 1300, the step of reading, by a bitstream generator, video information bits from the video information buffer at a predetermined rate and inserting, by the bitstream generator, a number of stuffing bits into the video information bitstream wherein the number of stuffing bits is determined according to a predetermined scheme to provide substantially minimized delay jitter smoothing the bitstream generator typically includes: (A) utilizing a stuffing bits generator for generating stuffing bits in accordance with the predetermined scheme (1302); (B) utilizing a stuffing bits buffer for storing the generated stuffing bits and providing the stuffing bits to an output switch in accordance with occurrence of one of selected predetermined occurrences (1304); (C) utilizing the output switch (1306) for receiving one of: (C1) input from the stuffing bits buffer upon occurrence of one of the selected predetermined occurrences, and (C2) input from the video information buffer upon nonoccurrence of one of the selected predetermined occurrences.

Typically, the selected predetermined occurrences include: (A) where a frame is removed from the hypothetical decoder buffer, a nonzero $S_n$ is inputted from the buffer condition verifier, the stuffing bits generator generates $\hat{S}_n$ stuffing bits in compliance with a preselected decoder bitstream syntax, and where a number of the generated stuffing bits $\hat{S}_n$ is different from $S_n$, $\hat{S}_n$ is selected to be a smallest number that is no less than $S_n$ in order to reduce incurred delay at a decoder, and (B) where both the video information buffer and the stuffing bits buffer are empty, the stuffing bits generator generates a minimum number of stuffing bits that is in compliance with the preselected decoder bitstream syntax to ensure that channel will not be idle.

In one embodiment, the outside decoder may be selected to be an H.261 decoder.

Figure 14:
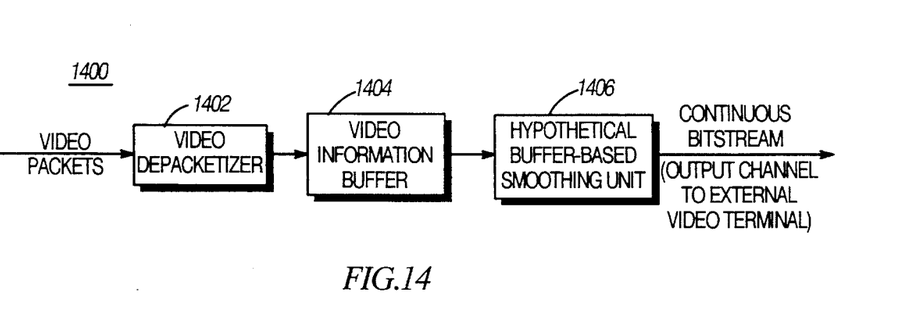
FIG. 14 is a block diagram of another embodiment of a hypothetical buffer-based jitter smoothing device for minimizing smoothing delay in a packet video communication system in accordance with the present invention.

FIG. 14, numeral 1400, is a block diagram of another embodiment of a hypothetical buffer-based jitter smoothing device for minimizing smoothing delay in a packet video communication system in accordance with the present invention. The device includes: A) a video depacketizer (1402) that is operably coupled to receive and depacketize digital video packets of a received digital video packet stream into video information bits, B) an information buffer (1404) that is operably coupled to the depacketizing means (1402), for storing the video information bits, and C) a hypothetical buffer-based smoothing unit (1406) that is operably coupled to the information buffer (1404), for utilizing a hypothetical buffer to generate and transmit a continuous stuffed video information bitstream at a predetermined rate.

As shown in FIG. 3, the hypothetical buffer-based smoothing unit may be implemented to include (322): (A) a frame bit counter (310), operably coupled to the video information buffer, for counting a number of bits for each video frame $E_n$, (B) a hypothetical buffer fullness counter (312), operably coupled to the video information buffer (304), for counting a hypothetical buffer fullness $B_n$, (C) a buffer condition verifier (314), operably coupled to the frame bit counter (310) and to the hypothetical buffer fullness counter (312), for verifying whether the number of the bits for a preselected frame removed from the hypothetical buffer satisfies a predetermined hypothetical buffer condition, and, where the predetermined hypothetical buffer condition is violated, for providing to the bitstream generator a number equal to the number of stuffing bits $S_n$, (D) a stuffing bits generator (320), operably coupled to the video information buffer (304), to the buffer condition verifier (314), and to a stuffing bit buffer (318), for generating stuffing bits in accordance with the predetermined scheme, (E) the stuffing bits buffer (318), operably coupled to the stuffing bits generator (320), for storing the generated stuffing bits and for providing the stuffing bits to an output switch in accordance with occurrence of one of selected predetermined occurrences, and (F) an output switch (316), operably coupled to the video information buffer (304) and to the stuffing bits buffer (318), for receiving one of: (F1) input from the stuffing bits buffer upon occurrence of one of the selected predetermined occurrences, and (F2) input from the video information buffer upon nonoccurrence of one of the selected predetermined occurrences.

Although embodiments of the present invention are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device in a receiving node of a packet video communication system for converting a received digital video packet stream into a continuous bitstream for transmission to a video decoder, the device comprising:

(A) a video depacketizer, operably coupled to receive and depacketize digital video packets of the received digital video packet stream into video information bits;

(B) a video information buffer, operably coupled to the video depacketizer for storing the video information bits;

(C) a decoder buffer verifier (DBV), operably coupled to the video information buffer, for determining a number of transmitted information bits for a video frame, and for monitoring a fullness of a hypothetical decoder buffer (HDB);

(D) a bitstream generator, operably coupled to the video information buffer and to the DBV, for transmitting the video information bits from the video information buffer at a predetermined rate and for inserting a number of stuffing bits into the video information bitstream wherein the number of stuffing bits is determined according to a predetermined scheme for minimizing buffering jitter to provide a continuous bitstream with a substantially minimized smoothing delay.

2. The device of claim 1 wherein the predetermined scheme includes inserting the stuffing bits into the bitstream when one of:

(A) a predetermined hypothetical decoder buffer condition is violated; and (B) the video information buffer is empty.

3. The device of claim 1 wherein the fullness, $B_n$, of the hypothetical decoder buffer (HDB) at time $t_n$ is determined according to $B_n = B_{n-1} + R_{n-1,n}$, where $B_{n-1}$ is the buffer fullness at time $t_{n-1}$, and $R_{n-1,n}$ is the number of video information bits transmitted during frame interval n-1 from time $t_{n-1}$ to $t_n$.

4. The device of claim 2 wherein the predetermined hypothetical decoder buffer condition is violated when $E_n < B_{n-1} + R_{n-1,n+1} - S$, where $E_n$ is the number of information bits removed from the HDB for frame n, $B_{n-1}$ is the HDB fullness at time $t_{n-1}$, $R_{n-1,n+1}$ is the number of information bits transmitted from time $t_{n-1}$ to $t_{n+1}$, and S is the size of the HDB.

5. The device of claim 4 wherein the predetermined hypothetical buffer condition is checked once every frame interval, and when the predetermined hypothetical buffer condition is violated, the stuffing bits are output to the bitstream generator before sending any video information bits from the video information buffer.

6. The device of claim 5 wherein the minimum number of stuffing bits $S_n$ is determined by $S_n = B_{n-1} + R_{n-1,n+1} - S - E_n$.

7. The device of claim 1 wherein the video decoder is an H.261 decoder.

8. The device of claim 7 wherein the bits stuffing is performed utilizing one of:

(A) macroblock address stuffing; and (B) error correction framing.

9. The device of claim 1 wherein a predetermined rate for reading video information bits from the video information buffer is selectable.

10. The device of claim 1 wherein the decoder buffer verifier includes:

(A) a frame bit counter, operably coupled to the video information buffer, for counting a number of bits for each video frame $E_n$, (B) a HDB fullness counter, operably coupled to the video information buffer, for counting a HDB fullness $B_n$, (C) a buffer condition verifier, operably coupled to the frame bit counter and to the HDB fullness counter, for verifying whether the number of the bits for a preselected frame removed from the HDB satisfies a predetermined hypothetical decoder buffer condition, and, where the predetermined hypothetical decoder buffer condition is violated, for providing to the bitstream generator a number equal to the number of stuffing bits $S_n$.

11. The device of claim 1 wherein the bitstream generator includes:

(A) a stuffing bits generator, operably coupled to the video information buffer, to the buffer condition verifier, and to a stuffing bit buffer, for generating stuffing bits in accordance with the predetermined scheme, (B) the stuffing bits buffer, operably coupled to the stuffing bits generator, for storing the generated stuffing bits and for providing the stuffing bits to an output switch in accordance with occurrence of one of selected predetermined occurrences, (C) the output switch, operably coupled to the video information buffer and to the stuffing bits buffer, for receiving one of:

(C1) input from the stuffing bits buffer upon occurrence of one of the selected predetermined occurrences, and (C2) input from the video information buffer upon nonoccurrence of one of the selected predetermined occurrences.

12. A method in a network receiving node of a packet video communication system for converting a received digital video packet bitstream into a continuous bitstream for transmission to a video decoder, the method comprising the steps of:

(A) receiving the digital video packet stream and storing the information bits contained in said packets;

(B) monitoring a fullness of a hypothetical decoder buffer by a decoder buffer verifier (DBV); and (C) reading, by a bitstream generator, video information bits from the video information buffer at a predetermined rate and inserting, by the bitstream generator, a number of stuffing bits into the video information bitstream wherein the number of stuffing bits is determined according to a predetermined scheme for minimizing buffering jitter to provide a continuous bitstream with a substantially minimized smoothing delay.

13. The method of claim 12 wherein the predetermined scheme includes inserting the stuffing bits into the bitstream when one of:

(A) a predetermined hypothetical buffer condition is violated; and (B) the video information buffer is empty.

14. The method of claim 12 wherein the fullness Bn of a hypothetical decoder buffer (HDB) at time tn, which is just before frame n is removed from the hypothetical decoder, is determined according to Bn=Bn−1+Rn−1,n, where Bn−1 is the buffer fullness just after frame n−1 is removed from the hypothetical decoder, and Rn−1,n is the number of video information bits transmitted during frame interval n−1 from time tn−1 to tn.

15. The method of claim 13 wherein the predetermined hypothetical decoder buffer condition is violated when $E_n < B_{n-1} + R_{n-1,n+1} - S$, where $E_n$ is the number of information bits removed from the hypothetical decoder buffer for frame n, $B_{n-1}$ is the hypothetical decoder buffer fullness at time tn−1, $R_{n-1,n+1}$ is the number of information bits transmitted from time tn−1 to tn+1, and S is the size of the hypothetical decoder buffer.

16. The method of claim 15 wherein the predetermined hypothetical buffer condition is checked at every frame interval, and when the predetermined hypothetical buffer condition is violated, the stuffing bits are output to the bitstream generator before sending any video information bits from the video information buffer.

17. The method of claim 16 wherein the minimum number of stuffing bits $S_n$ is determined by $S_n = B_{n-1} + R_{n-1,n+1} - S - E_n$.

18. The method of claim 12 wherein the external decoder is an H.261 decoder.

19. The method of claim 18 wherein the bits stuffing is performed utilizing one of:

(A) macroblock address stuffing; and (B) error correction framing.

20. The method of claim 12 wherein a predetermined rate for reading video information bits from the video information buffer is selectable.

21. The method of claim 12 wherein the step of monitoring a fullness of a hypothetical decoder buffer by a decoder buffer verifier (DBV) includes:

(A) utilizing a frame bit counter for counting a number of bits for each frame En transmitted from the video information buffer, (B) utilizing a decoder buffer fullness counter for counting a decoder buffer fullness Bn, (C) utilizing a buffer condition verifier for verifying whether the number of bits for a preselected frame removed from the HDB satisfies a predetermined hypothetical decoder buffer condition, and, when the predetermined hypothetical decoder buffer condition is violated, providing to the bitstream generator a number equal to the number of stuffing bits Sn.

22. The method of claim 12 wherein the step of reading, by a bitstream generator, video information bits from the video information buffer at a predetermined rate and inserting, by the bitstream generator, a number of stuffing bits into the video information bitstream wherein the number of stuffing bits is determined according to a predetermined scheme to provide substantially minimized delay jitter smoothing includes:

(A) utilizing a stuffing bits generator for generating stuffing bits in accordance with the predetermined scheme, (B) utilizing a stuffing bits buffer for storing the generated stuffing bits and providing the stuffing bits to an output switch in accordance with occurrence of one of selected predetermined occurrences, (C) utilizing the output switch for receiving one of:

(C1) input from the stuffing bits buffer upon occurrence of one of the selected predetermined occurrences, and (C2) input from the video information buffer upon nonoccurrence of one of the selected predetermined occurrences.

23. The method of claim 22 wherein the selected predetermined occurrences include:

(A) where a frame is removed from the HDB, a nonzero Sn inputted from the buffer condition verifier, the stuffing bits generator generates Sn stuffing bits in compliance with a preselected decoder bitstream syntax, and where a number of the generated stuffing bits $\hat{S}_n$ is different from Sn, $\hat{S}_n$ is selected to be a smallest number that is no less than Sn in order to reduce incurred delay at a decoder, and (B) where both the video information buffer and the stuffing bits buffer are empty, the stuffing bits generator generates a minimum number of stuffing bits that is in compliance with the preselected decoder bitstream syntax to ensure that channel will not be idle.

24. A hypothetical buffer-based jitter smoothing device for minimizing smoothing delay in a packet video communication system, the device comprising:

A) a video depacketizer, operably coupled to receive and depacketize digital video packets of a received digital video packet stream into video information bits, B) an information buffer, operably coupled to the depacketizing means, for storing the video information bits, C) hypothetical buffer-based smoothing means, operably coupled to the information buffer, for utilizing a hypothetical buffer to generate and transmit a continuous stuffed video information bitstream at a predetermined rate and minimize buffering jitter.

25. The hypothetical buffer-based jitter smoothing device of claim 24 wherein a number of stuffing bits inserted into the video information bitstream is determined according to a predetermined scheme.

26. The hypothetical buffer-based jitter smoothing device of claim 24 wherein the hypothetical buffer-based smoothing means determines a number of stuffing bits to be transmitted for a video frame and monitors a fullness of the hypothetical buffer.

27. The hypothetical buffer-based jitter smoothing device of claim 25 wherein the predetermined scheme includes inserting the stuffing bits into the bitstream, i.e., bits stuffing, when one of:

(A) a predetermined hypothetical buffer condition is violated; and (B) the video information buffer is empty.

28. The hypothetical buffer-based jitter smoothing device of claim 26 wherein the fullness, $B_n$, of the hypothetical buffer at time $t_n$ is determined according to $B_n = B_{n-1} + R_{n-1,n}$, where $B_{n-1}$ is the buffer fullness at time $t_{n-1}$, and $R_{n-1,n}$ is the number of video information bits transmitted during frame interval n–1 from time $t_{n-1}$ to $t_n$.

29. The hypothetical buffer-based jitter smoothing device of claim 27 wherein the predetermined hypothetical buffer condition is violated when $E_n < B_{n-1} + R_{n-1,n+1} - S$, where $E_n$ is the number of information bits removed from the hypothetical buffer for frame n, $B_{n-1}$ is the fullness of said buffer at time $t_{n-1}$, $R_{n-1,n+1}$ is the number of information bits transmitted from time $t_{n-1}$ to $t_{n+1}$, and S is the size of the hypothetical buffer.

30. The hypothetical buffer-based jitter smoothing device of claim 27 wherein the predetermined hypothetical buffer condition is checked once every frame interval, and when the predetermined hypothetical buffer condition is violated, the stuffing bits are inserted into the video information bitstream before sending any video information bits from the video information buffer.

31. The hypothetical buffer-based jitter smoothing device of claim 30 wherein the minimum number of stuffing bits $S_n$ is determined by $S_n = B_{n-1} + R_{n-1,n+1} - S - E_n$.

32. The hypothetical buffer-based jitter smoothing device of claim 24 wherein the continuous stuffed video information bitstream output from the jitter smoothing device is transmitted to an H.261 decoder.

33. The hypothetical buffer-based jitter smoothing device of claim 32 wherein the bits stuffing is performed utilizing one of:

(A) macroblock address stuffing; and (B) error correction framing.

34. The hypothetical buffer-based jitter smoothing device of claim 26 wherein determining the number of stuffing bits to be transmitted for the video frame is performed at a predetermined selectable rate.

35. The hypothetical buffer-based jitter smoothing device of claim 24 wherein the hypothetical buffer-based smoothing means includes:

(A) a frame bit counter, operably coupled to the video information buffer, for counting a number of bits for each video frame $E_n$, (B) a hypothetical buffer fullness counter, operably coupled to the video information buffer, for counting a hypothetical buffer fullness $B_n$, (C) a buffer condition verifier, operably coupled to the frame bit counter and to the hypothetical buffer fullness counter, for verifying whether the number of the bits for a preselected frame removed from the hypothetical buffer satisfies a predetermined hypothetical buffer condition, and, where the predetermined hypothetical buffer condition is violated, for providing to the bitstream generator a number equal to the number of stuffing bits $S_n$, (D) a stuffing bits generator, operably coupled to the video information buffer, to the buffer condition verifier, and to a stuffing bit buffer, for generating stuffing bits in accordance with the predetermined scheme, (E) the stuffing bits buffer, operably coupled to the stuffing bits generator, for storing the generated stuffing bits and for providing the stuffing bits to an output switch in accordance with occurrence of one of selected predetermined occurrences, and (F) the output switch, operably coupled to the video information buffer and to the stuffing bits buffer, for receiving one of:

(F1) input from the stuffing bits buffer upon occurrence of one of the selected predetermined occurrences, and (F2) input from the video information buffer upon nonoccurrence of one of the selected predetermined occurrences.

* * * * *